(12) United States Patent
Hori

(10) Patent No.: US 8,667,331 B2
(45) Date of Patent: Mar. 4, 2014

(54) STORAGE SYSTEM AND CONTROL METHOD FOR STORING WRITE DATA REQUESTED BY A HOST COMPUTER

(75) Inventor: Masanori Hori, Odawara (JP)

(73) Assignee: Hitachi, Ltd., Tokyo (JP)

( * ) Notice: Subject to any disclaimer, the term of this patent is extended or adjusted under 35 U.S.C. 154(b) by 325 days.

(21) Appl. No.: 13/142,517

(22) PCT Filed: Jun. 16, 2011

(86) PCT No.: PCT/JP2011/003433
§ 371 (c)(1),
(2), (4) Date: Jun. 28, 2011

(87) PCT Pub. No.: WO2012/172608
PCT Pub. Date: Dec. 20, 2012

(65) Prior Publication Data
US 2012/0324274 A1 Dec. 20, 2012

(51) Int. Cl.
G06F 11/00 (2006.01)
(52) U.S. Cl.
USPC ............................. 714/22; 714/6.3; 714/47.1
(58) Field of Classification Search
None
See application file for complete search history.

(56) References Cited

U.S. PATENT DOCUMENTS

| 7,395,452 B2 * | 7/2008 | Nicholson et al. ............... 714/22 |
| 8,006,036 B2 * | 8/2011 | Ninomiya et al. ............ 711/113 |
| 2009/0249008 A1 | 10/2009 | Hosaka |
| 2010/0146333 A1 | 6/2010 | Yong et al. |
| 2011/0197036 A1 * | 8/2011 | Ishii ............................... 711/155 |
| 2012/0221801 A1 * | 8/2012 | Okawa .......................... 711/154 |
| 2013/0097458 A1 * | 4/2013 | Sekino et al. .................. 714/6.3 |

FOREIGN PATENT DOCUMENTS

JP 2009-237881 A 10/2009

* cited by examiner

Primary Examiner — Christopher McCarthy
(74) Attorney, Agent, or Firm — Volpe and Koenig, P.C.

(57) ABSTRACT

It is provided a storage system for storing write data requested by a host computer, comprising: a data storage device, first and second cache memories, first and second non-volatile memories and at least one power storage device, wherein the storage system stores the requested write data in the data storage device, without storing the requested write data in neither the first cache memory nor the second cache memory in a case where the amount of charge of the at least one power storage device is smaller than the predetermined amount of power, and stores the requested write data in at least one of the first and second cache memories, and then store the requested write data in the data storage device in a case where the amount of charge of the at least one power storage device is equal to or larger than the predetermined amount of power.

12 Claims, 13 Drawing Sheets

STORAGE SYSTEM AND CONTROL METHOD FOR STORING WRITE DATA REQUESTED BY A HOST COMPUTER

TECHNICAL FIELD

This invention relates to a storage system.

BACKGROUND ART

A storage system improves its performance in terms of response to a host computer by installing a cache memory capable of reading/writing at high speed data that is requested by the host computer to be read or written. As the cache memory, which is required to read/write data at high speed, a volatile DRAM is usually used.

The cache memory is a memory for temporarily storing data that is requested by the host computer to be written, and consequently is small in capacity and not so large in power consumption. Therefore, in the event of a power outage, a battery supplies power to the cache memory to keep dirty data which is not stored in a disk drive but is stored in the cache memory. This means that the data can be kept only for a limited period of time that is determined by the capacity of the battery.

In recent years, cache memory capacity is increasing as the storage capacity of storage systems becomes larger. Cache memories consume accordingly more power. The enhanced speed of cache memories is another factor that increases the power consumption of cache memories.

The increase in the power consumption of cache memories shortens the period of time in which a cache memory can keep stored dirty data with the use of a battery. As a countermeasure, a backup method for keeping data stored in a cache memory during a power outage has been introduced in which, when a power outage occurs, the electric power of a battery is used to migrate data stored in a cache memory to a non-volatile flash memory (see JP 2009-237881 A).

SUMMARY OF INVENTION

Technical Problem

The backup method described above which uses a flash memory consumes large power for data migration per power outage and has a problem in that, in the case where a power outage strikes again before the battery is charged to a sufficient level, data stored in the cache memory cannot be migrated to the flash memory and cannot be protected consequently.

In short, whereas the backup method that keeps data in a cache memory is capable of backing up data for a short period of time when the amount of charge of the battery is small, the backup method that migrates data to a flash memory has a fear of failing to back up some of data and losing the data when power outages occur in succession and diminish the amount of charge of the battery as a result.

Successive power outages occur also when the voltage of a commercial power source is unstable. Further, in the case of green energy and private power generation where the output voltage is unstable, a power outage (i.e., a drop in power supply voltage) is sometimes detected frequently.

When the amount of battery charge is insufficient, there is thus a fear of failing to back up data stored in the cache memory and the storage system accordingly operates in a cache-through mode in which data is written directly in the disk drive without using the cache memory. In the cache-through mode, the response performance of the storage system declines significantly.

Cutting short the period of time in which the storage system operates in the cache-through mode is therefore requested.
Solution to Problem A representative aspect of this invention is as follows. That is, there is provided a storage system
Advantageous Effects of Invention According to a representative embodiment of this invention, the storage system is improved in response performance by cutting short the period of time in which the storage system operates in a cache-through mode.

DESCRIPTION OF EMBODIMENTS

First Embodiment

Figure 1:
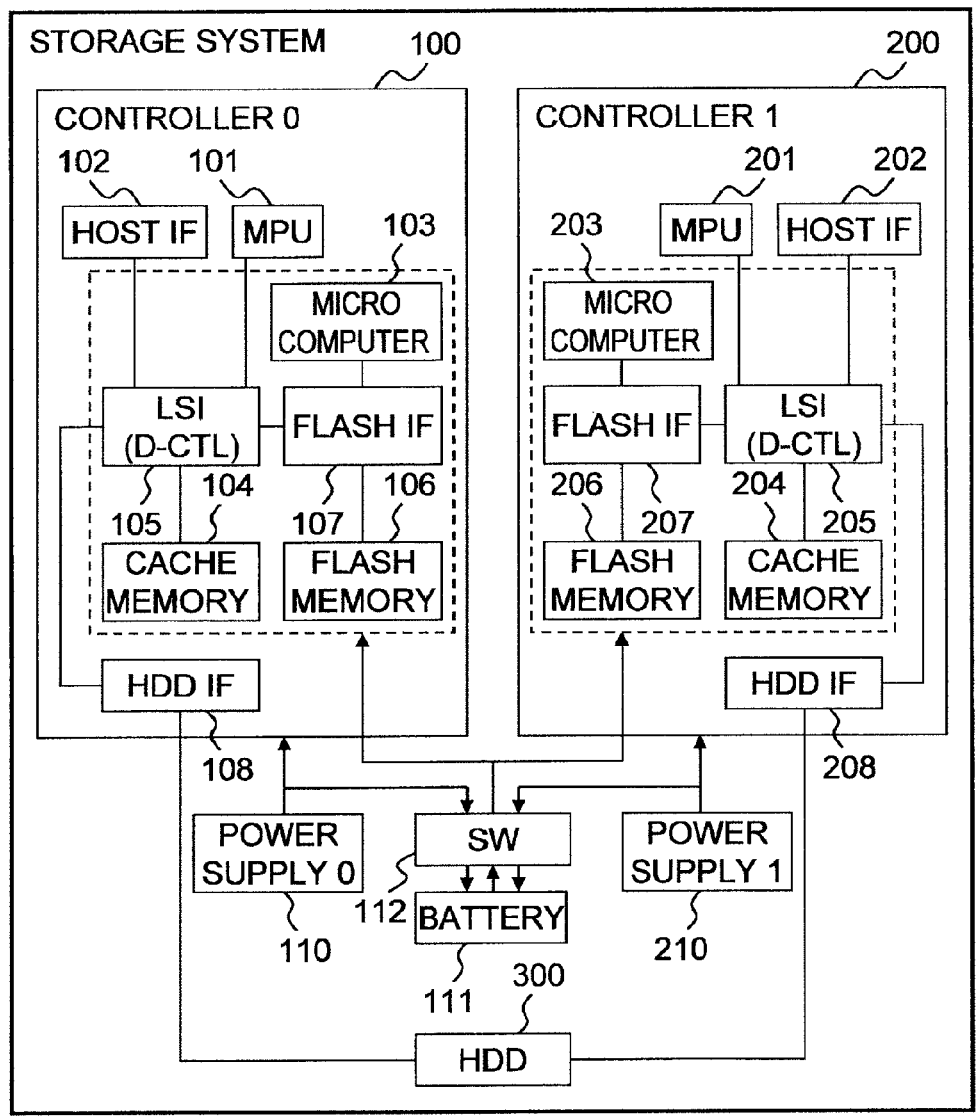
FIG. 1 is a block diagram illustrating a configuration of the storage system according to the first embodiment of this invention.

A storage system of a first embodiment has a feature in that the storage system operates using a cache memory 104 and/or a cache memory 204 even when a battery 111 is not charged fully, if the amount of charge of the battery 111 exceeds enough power to back up data stored in the cache memory 104 or 204 of one controller 100 or 200 to a flash memory 106 or 206.

FIG. 1 is a block diagram illustrating a configuration of the storage system according to the first embodiment of this invention.

The storage system of the first embodiment includes two controllers, 100 and 200, two power supplies, 110 and 210, one battery, 111, one battery switch, 112, and a data storage device 300.

The storage system of the first embodiment has two controller-power supply sets and both sets operate the same way, which enables the storage system to continue operating when a failure occurs in one of the systems.

The controller 100 includes a micro processor 101, a host interface 102, a micro computer 103, the cache memory 104, LSI 105, the flash memory 106, a flash interface 107, and a disk interface 108.

The micro processor 101 executes a program stored in a memory (not shown), to thereby control the operation of the controller 100.

The host interface 102 communicates with a host computer, which is coupled to the storage system, following a given protocol to receive data write and data read requests from the host computer coupled to the storage system.

The micro computer 103 includes a power-saving micro processor and executes a program stored in an internal memory, to thereby control the migration of data from the cache memory 104 to the flash memory 106.

The cache memory 104 is a volatile memory which temporarily stores data requested by the host computer to be written, before the requested data is stored in the data storage device 300. A DRAM is generally used as the cache memory 104. Data stored in the cache memory 104 is therefore lost when power is cut off.

The LSI 105 is a data controller which controls data transfer between the host interface 102, the cache memory 104, and the disk interface 108 following instructions of the micro processor 101.

The flash memory 106 is a non-volatile memory for storing data that has been stored in the cache memory 104 in the event of a power outage. A semiconductor non-volatile storage device (SSD: Solid State Drive), for example, can be used as the flash memory 106.

The flash interface 107 is an interface for inputting/outputting data to/from the flash memory 106.

The disk interface 108 is an interface for inputting/outputting data to/from the data storage device 300.

The controller 200 includes a micro processor 201, a host interface 202, a micro computer 203, the cache memory 204, LSI 205, the flash memory 206, a flash interface 207, and a disk interface 208. A configuration and operation of the controller 200 are the same as the configuration and operation of the controller 100 described above, and descriptions thereof are therefore omitted.

The power supplies 110 and 210 each convert a commercial power source into a direct-current power source to supply direct-current power having at least one voltage necessary for the storage system (e.g., the controller 100 or 200). The power supply 110 supplies power to the controller 100, and the power supply 210 supplies power to the controller 200. The power supplies 110 and 210 also supply power for charging the battery 111.

The battery 111 is constituted of a chargeable/dischargeable secondary battery (for example, a nickel-metal hydride battery or a lithium ion battery). When a power outage occurs, the battery 111 supplies power to a part of the controller 100 or 200 (for example, the micro computer 103, the cache memory 104, the LSI 105, the flash memory 106, and the flash interface 107). A large-capacity capacitor may be used instead of the battery 111.

The battery switch 112 is a switch for switching to/from a connection between the battery 111 and the controllers 100 and 200 and a connection between the battery 111 and the power supplies 110 and 210.

The battery 111 and the battery switch 112, which are provided outside the controllers 100 and 200 in this embodiment, may be provided inside one of the controllers 100 and 200.

The data storage device 300 is constituted of a plurality of magnetic disk drives, and stores user data requested by the host computer. The plurality of magnetic disk drives constitute a RAID to prevent a loss of user data in the event of a failure in at least one of the magnetic disk drives.

Figure 2:
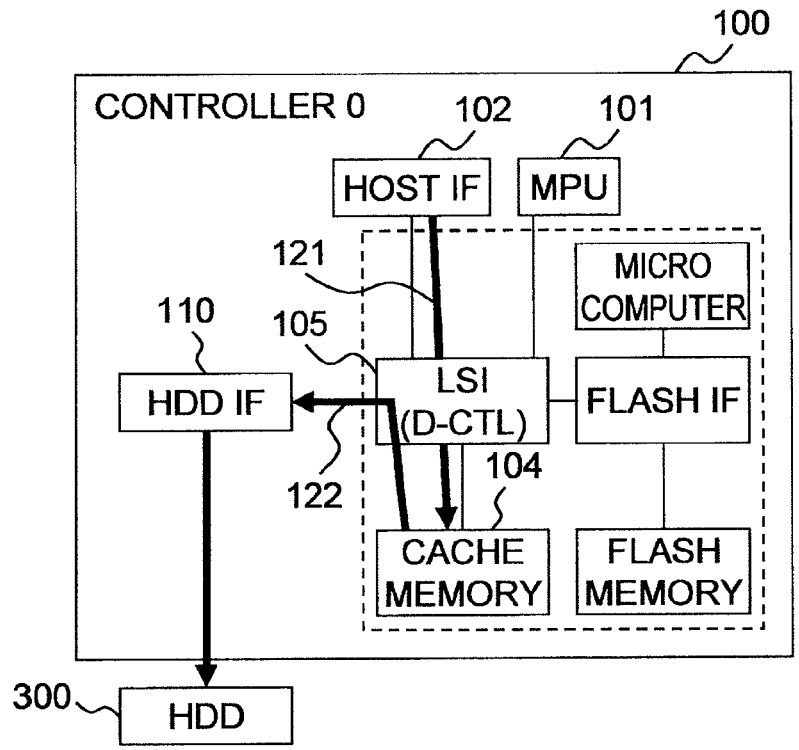
FIG. 2 is an explanatory diagram illustrating operation of a normal mode of the storage system according to embodiments of this invention.
Figure 3:
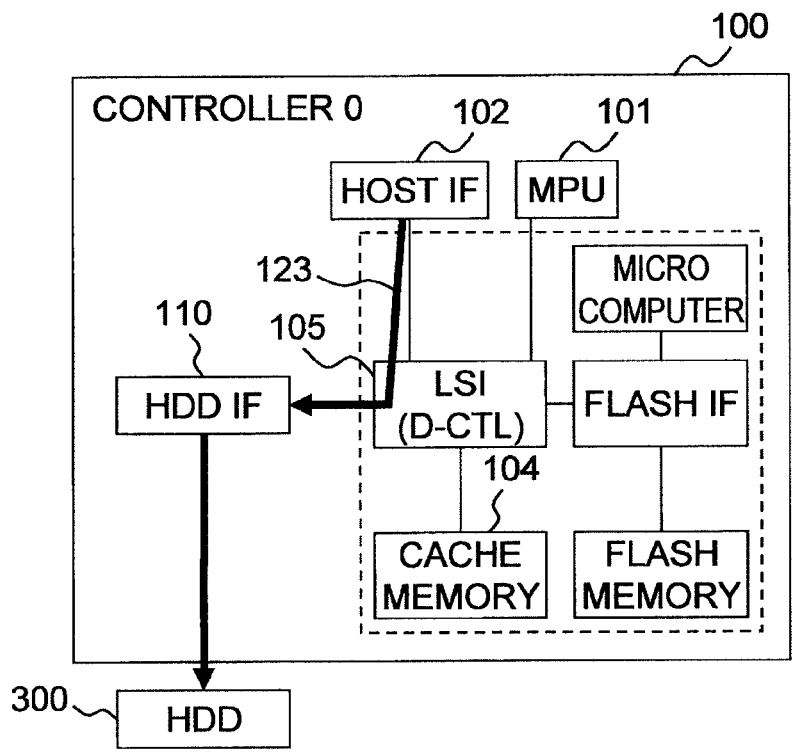
FIG. 3 is an explanatory diagram illustrating operation of a cache-through mode of the storage system according to embodiments of this invention.

FIGS. 2 and 3 are diagrams illustrating operation modes of storage systems according to embodiments of this invention. FIG. 2 illustrates a normal mode and FIG. 3 illustrates a cache-through mode.

As illustrated in FIG. 2, the storage system in the normal mode temporarily writes write data requested by the host computer in the cache memory 104 (121), and then writes the write data in the data storage device 300 at a suitable timing (122). After finishing writing the write data in the cache memory 104, the storage system transmits a notification of the completion of writing the write data to the host computer.

The controller 100 transfers data written in the cache memory 104 to the controller 200. The controller 200 writes the data transferred from the controller 100 in the cache memory 204. In anticipation of a controller failure or a cache failure, data is always saved in duplicate in the two cache memories 104 and 204, and the two cache memories store the same data. The controller 100 and the controller 200 also control the cache memories 104 and 204 to be in synchronization with each other so that data written in the data storage device 300 by the controller 100 is deleted from the cache memory 104 and from the cache memory 204 as well. In short, because the cache memories 104 and 204 store the same data, dirty data stored in the cache memories 104 and 204 can be protected by backing up the data stored in one of the cache memories 104 and 204 to the flash memory 106 or 206 when a power outage occurs.

As illustrated in FIG. 3, the storage system operates in the cache-through mode in the case where a failure occurs in one of the cache memories or in the case where there is a fear of losing data that is stored in one of the cache memories (for example, when data stored in the cache memory cannot be backed up at the time of a power outage). The storage system in the cache-through mode writes write data requested by the host computer directly in the data storage device 300 without writing the write data in the cache memory 104 (123). After finishing writing the write data in the data storage device 300, the storage system transmits a notification of the completion of writing the write data to the host computer.

The performance of the storage system in terms of response to the host computer is poor in the cache-through mode where the notification of the completion of writing write data is transmitted to the host computer after the writing of the write data in the data storage device 300 is finished, compared to the normal mode where the notification of the completion of writing write data is transmitted to the host computer before the writing of the write data in the data storage device 300 is finished. It is therefore important from the viewpoint of improving the storage system performance to keep the storage system from operating in the cache-through mode as much as possible.

Figure 4:
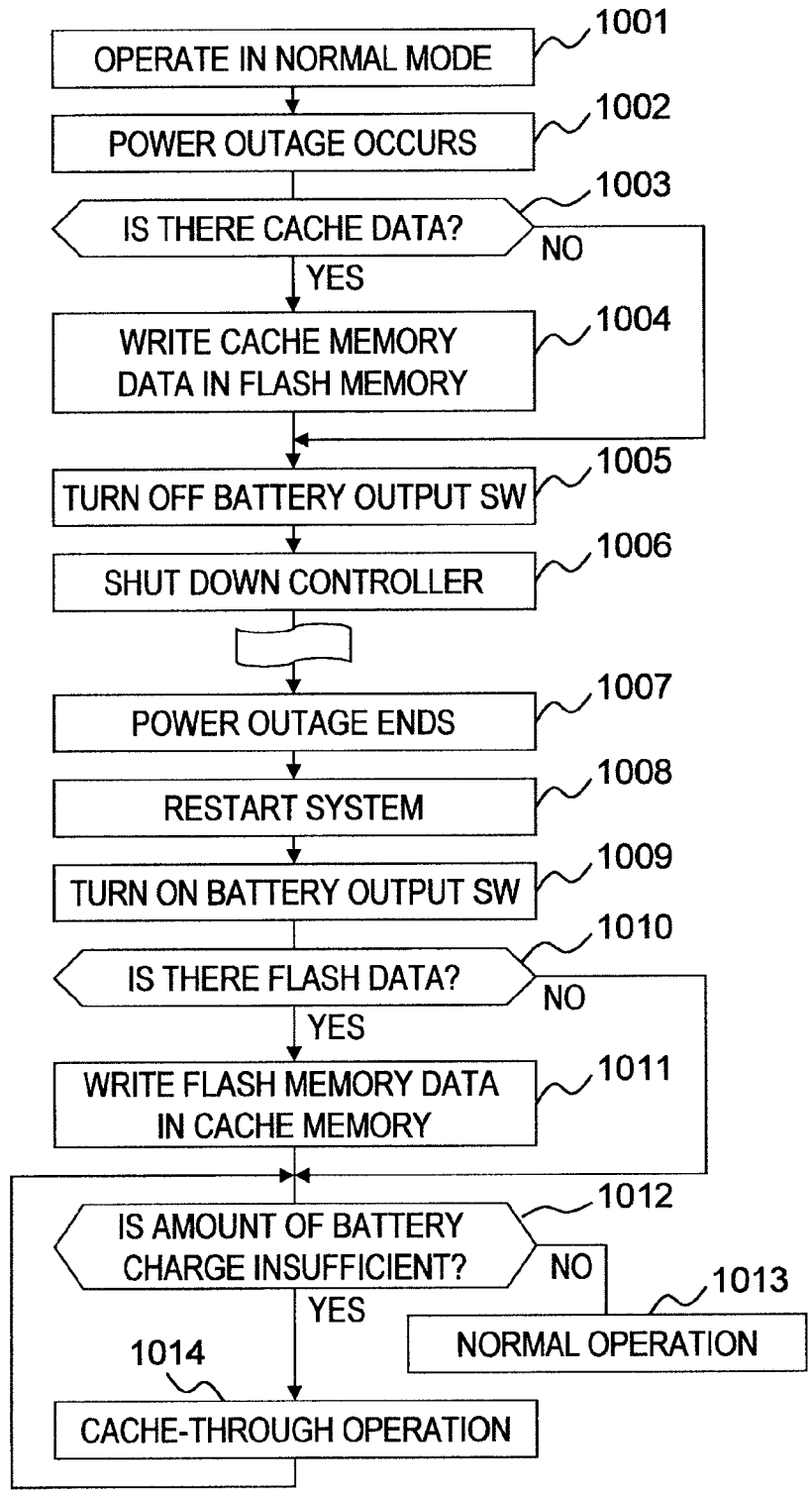
FIG. 4 is a flow chart of power source switching processing of the storage system according to the first embodiment.
Figure 5A:
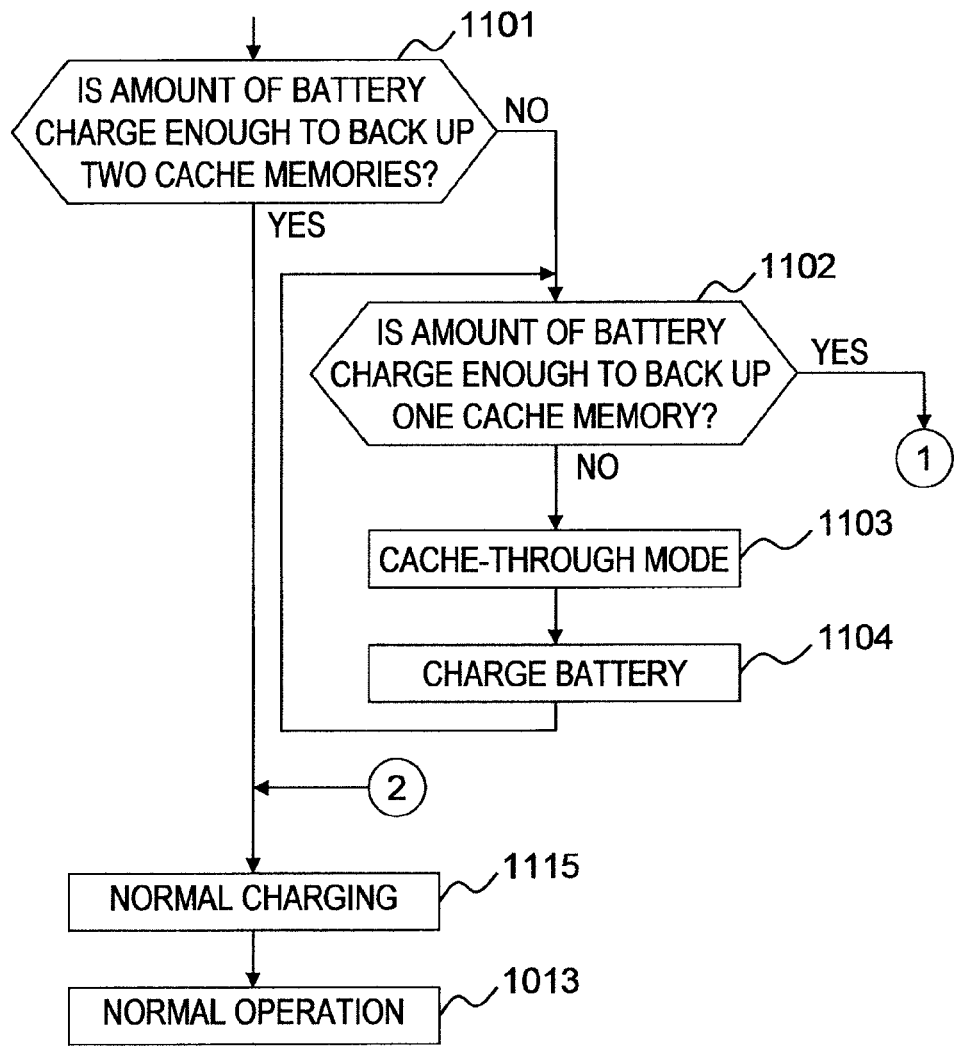
FIG. 5A is a flow chart of detailed power source switching processing of the storage system according to the first embodiment.
Figure 5B:
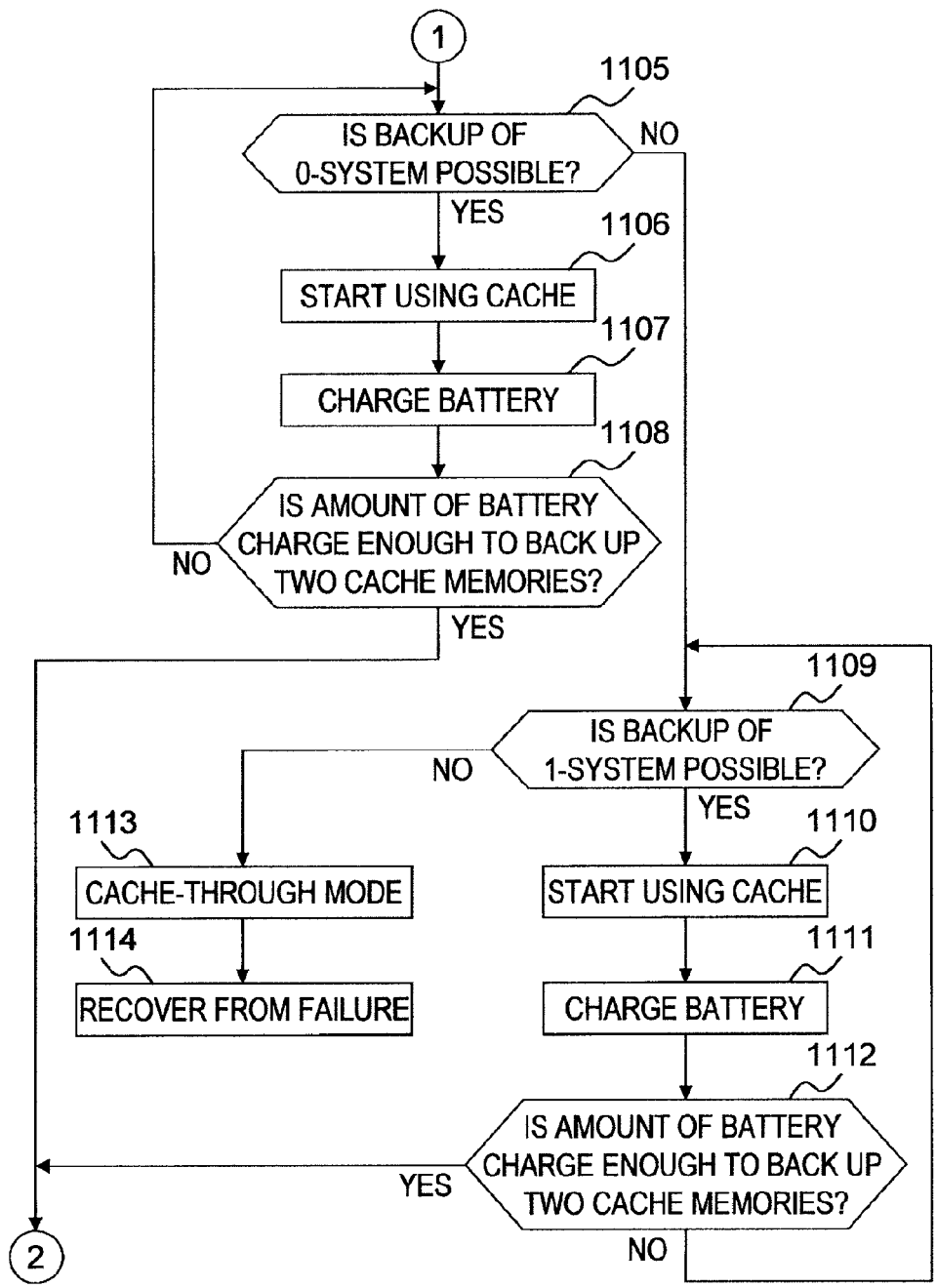
FIG. 5B is a flow chart of detailed power source switching processing of the storage system according to the first embodiment.

FIG. 4 is a flow chart of power source switching processing of the storage system according to the first embodiment. The description given with reference to FIG. 4 and FIGS. 5A and 5B is mainly about processing of the controller 100, which belongs to a 0-system, but this processing may be executed by the controller 200, which belongs to a 1-system.

Commercial power is normally supplied to the storage system and the storage system operates in the normal mode (illustrated in FIG. 2) when there is no failure (1001).

In the case where the commercial power stops due to a power outage, or in the case where a failure occurs in one of the power supplies 110 and 210, the supply of power to the controller 100 and/or the controller 200 is cut off (1002). The drop in a voltage output from the power supply 110 or 210 turns the battery switch 112 on to connect the battery 111 to at least one of the controllers 100 and 200, and the supply of power from the battery 111 to at least one of the controllers 100 and 200 is started.

The micro computer 103 then determines whether the cache memory 104 is storing dirty data which has not been stored in the data storage device 300 (1003). When it is determined as a result that no dirty data is stored in the cache memory 104, the processing proceeds to Step 1005 without backing up data that is stored in the cache memory 104.

In the case where the cache memory 104 is storing dirty data, on the other hand, the micro computer 103 reads the dirty data out of the cache memory 104 and writes the dirty data in the flash memory 106 (1004). After finishing writing the data in the flash memory 106, thereby completing the backing up of the dirty data stored in the cache memory 104, the micro computer 103 turns the battery switch 112 off (1005), and stops the operation of the controller 100 (1006). By turning the battery switch 112 off while the operation of the controller 100 is stopped, the wasting of the battery 111 due to a leak current is reduced.

In the case where the cache memory 104 stores setting information of the storage system, the setting information is backed up to the flash memory 106 in addition to dirty data stored in the cache memory 104. When the cache memory 104 is storing dirty data or setting information to be backed up, it is determined in Step 1003 that there is cache data, and the processing proceeds to Step 1004.

When the power outage ends and the power supplies 110 and 210 resume supplying power to the controllers 100 and 200 (1007), the micro processor 101 executes a given program, to thereby restart the storage system (1008).

In the case where a voltage output from at least one of the power supplies 110 and 210 exceeds a given threshold, the battery switch 112 is turned on to connect the battery 110 to the one of the power supplies 110 and 210 (1009). The battery switch 112 may turn on while the storage system is operating, and may turn to connect the battery 111 and the controller 100 in a case of drop in a voltage output from the power supplies 110 or 210. Power for charging the battery 110 is thus supplied to the battery 110 from the one of the power supplies 110 and 210.

The micro computer 103 then determines whether the flash memory 106 is storing data (1010). When it is determined as a result that no data is stored in the flash memory 106, the processing proceeds to Step 1012 without writing data that the flash memory 106 stores in the cache memory 104.

In the case where the flash memory 106 is storing data, on the other hand, the micro computer 103 reads the data out of the flash memory 106 and writes the data in the cache memory 104 (1011). The data written in the cache memory 104 is then written in the data storage device 300 at a suitable timing. If the data written in the cache memory 104 has already been written in the data storage device 300, there is no need to write the data in the data storage device 300 after power is restored.

Steps 1010 and 1011, which are executed by the micro computer 103 in the first embodiment, may be executed by the micro processor 101.

Thereafter, the micro processor 101 determines the amount of charge of the battery 111 (1012) and, depending on the result of the determination, whether the storage system is to operate in the normal mode (illustrated in FIG. 2) (1013) or the cache-through mode (illustrated in FIG. 3) (1014) is determined. Specifically, in the case where a power outage occurs again when the battery 111 is not charged with enough power to write data stored in the cache memory 104 in the flash memory 106, there is a fear of losing the data stored in the cache memory 104 and the storage system therefore operates in the cache-through mode where the cache memory 104 is not used. Details of Steps 1012 to 1014 are described with reference to FIGS. 5A and 5B.

The amount of charge (the remaining charge) of the battery 111 can be calculated from the battery output voltage, by accumulating charging current values and discharging current values.

FIGS. 5A and 5B are flow charts of detailed power source switching processing of the storage system according to the first embodiment, and illustrate details of Steps 1012 to 1014 of the flow chart of FIG. 4.

First, the micro processor 101 determines whether the amount of charge of the battery 111 exceeds enough power to back up data stored in the cache memories of two controllers (1101). When it is determined as a result that the amount of charge of the battery 111 exceeds enough power to back up data stored in the cache memories of two controllers, the micro processor 101 exerts control in a manner that charges the battery 111 to full (1115), and starts operating in the normal mode (illustrated in FIG. 2) (1013).

In the case where the amount of charge of the battery 111 falls short of enough power to back up data stored in the cache memories of two controllers, on the other hand, the micro processor 101 determines whether the amount of charge of the battery 111 exceeds enough power to back up data stored in the cache memory of one controller (1102).

When it is determined as a result that the amount of charge of the battery 111 falls short of enough power to back up data stored in the cache memory of one controller (NO in 1102), the micro processor 101 starts operating in the cache-through mode (illustrated in FIG. 3) (1103), and the battery 111 is supplied with power for charging (1104). Steps 1103 and 1104 are repeated until it is determined in Step 1102 that the amount of charge of the battery 111 exceeds enough power to back up data stored in the cache memory of one controller.

In the case where the amount of charge of the battery 111 exceeds enough power to back up data stored in the cache memory of one controller (YES in 1102), on the other hand, the micro processor 101 determines whether data stored in the cache memory 104 of the controller 100 of the 0-system can be backed up (1105). It is determined that data of the 0-system cannot be backed up when, for example, the 0-system controller 100 is experiencing a failure or when the battery 111 is experiencing a failure.

When it is determined as a result that data stored in the cache memory 104 of the controller 100 of the 0-system can be backed up, the micro processor 101 starts operating in the normal mode where the cache memory 104 is used (1106), and exerts control in a manner that supplies the battery 111 with power for charging (1107). This step may use only one cache memory, 104, or both of the cache memories 104 and 204.

Thereafter, the micro processor 101 determines whether the amount of charge of the battery 111 exceeds enough power to back up data stored in the cache memories of two controllers (1108). When it is determined as a result that the amount of charge of the battery 111 exceeds enough power to back up data stored in the cache memories of two controllers, the micro processor 101 exerts control in a manner that charges the battery 111 to full (1115), and starts operating in the normal mode (illustrated in FIG. 2) (1013).

In the case where the amount of charge of the battery 111 falls short of enough power to back up data stored in the cache memories of two controllers, on the other hand, the processing returns to Step 1105 to repeat Steps 1105 to 1108 until the amount of charge of the battery 111 exceeds enough power to back up data stored in the cache memories of two controllers.

In the case where data stored in the cache memory 104 of the controller 100 of the 0-system cannot be backed up (NO in Step 1105), the micro processor 101 determines whether data stored in the cache memory 204 of the controller 200 of the 1-system can be backed up (1109). It is determined that data of the 1-system cannot be backed up when, for example, the 1-system controller 200 is experiencing a failure or when the battery 111 is experiencing a failure.

When it is determined as a result that data stored in the cache memory 204 of the controller 200 of the 1-system cannot be backed up, the micro processor 101 starts operating in the cache-through mode (illustrated in FIG. 3) (1113) if the controller 200 of the 1-system is working, sends out a failure alarm from the storage system, and waits for an administrator to execute failure recovery processing (for example, replacing the failed part) (1114).

In the case where data stored in the cache memory 204 of the controller 200 of the 1-system can be backed up, on the other hand, the micro processor 101 starts operating in the normal mode (illustrated in FIG. 2) where the cache memory 104 is used (1110), and the battery 111 is supplied with power for charging (1111). This step may use only one cache memory, 104, or both of the cache memories 104 and 204.

Thereafter, the micro processor 101 determines whether the amount of charge of the battery 111 exceeds enough power to back up data stored in the cache memories of two controllers (1112). When it is determined as a result that the amount of charge of the battery 111 exceeds enough power to back up data stored in the cache memories of two controllers, the micro processor 101 exerts control in a manner that charges the battery 111 to full (1115), and starts operating in the normal mode (illustrated in FIG. 2) (1013).

In the case where the amount of charge of the battery 111 falls short of enough power to back up data stored in the cache memories of two controllers, on the other hand, the processing returns to Step 1109 to repeat Steps 1109 to 1112 until the amount of charge of the battery 111 exceeds enough power to back up data stored in the cache memories of two controllers.

Figure 6:
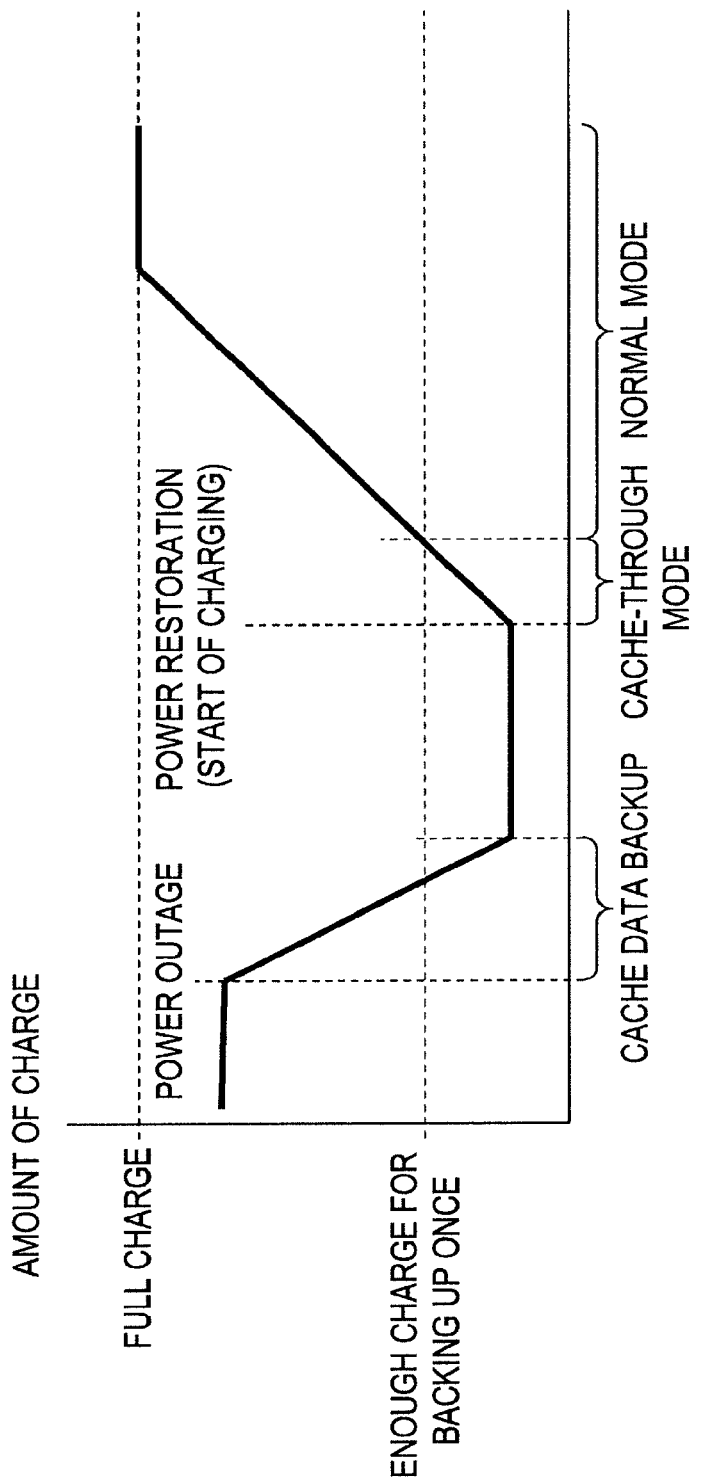
FIG. 6 is a timing chart illustrating an operation of the storage system according to the first embodiment.

FIG. 6 is a timing chart illustrating the relation between power source switching and the operation of the controllers 100 and 200 according to the first embodiment When a power outage occurs, power supplied from the battery 111 is used to back up data stored in the cache memory 104 and data stored in the cache memory 204 to the flash memory 106 and the flash memory 206, respectively. This diminishes the amount of charge of the battery 111.

When power is restored, the power supplies 110 and 210 supply power to the battery 111 to start charging. At this point, the amount of charge of the battery 111 falls short of power necessary to back up data stored in the cache memory 104 to the flash memory 106, and the controllers 100 and 200 therefore operate in the cache-through mode.

Then, after the amount of charge of the battery 111 reaches power necessary to back up data stored in the cache memory 104 to the flash memory 106, the controllers 100 and 200 start operating using the cache memories 104 and 204.

As described above, according to the first embodiment, the storage system operates using the cache memories even when the battery is not charged fully, if the amount of battery charge exceeds enough power to back up data stored in the cache memory of one controller. The period of time in which the storage system operates in the cache-through mode is thus reduced, and the storage system is accordingly improved in response performance and reliability.

Second Embodiment

A storage system according to a second embodiment has a feature in that the storage system operates using the cache memory 104 and/or the cache memory 204 even when the battery 111, which belongs to the 0-system, or a battery 211, which belongs to the 1-system, is not charged fully, if the amount of charge of the battery 111 or 211 exceeds enough power to back up data stored in the cache memory 104 or 204 of one controller 100 or 200. The storage system also has a feature in that, in the event of a failure in the controller 100 or 200 and the battery 111 or 211, the storage system exerts control to change the charging priority order in a manner that stops the charging of the battery of the failed system and charges the battery of the other system.

Figure 7:
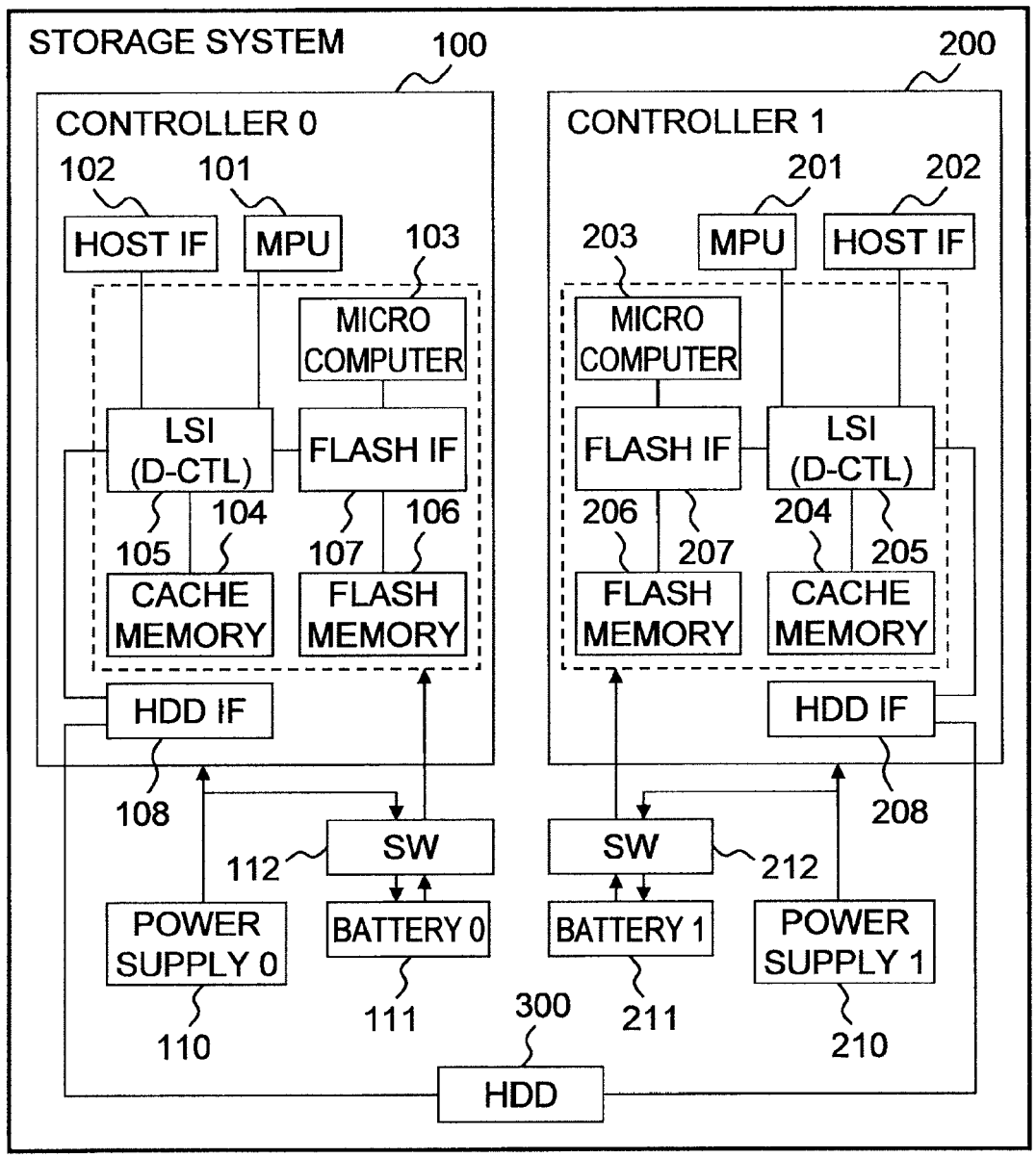
FIG. 7 is a block diagram illustrating a configuration of the storage system according to the second embodiment of this invention.

FIG. 7 is a block diagram illustrating a configuration of the storage system according to the second embodiment of this invention.

In the second embodiment, the same components as those in the first embodiment described above are denoted by the same reference symbols, and descriptions thereof are omitted here.

The storage system of the second embodiment includes two controllers, 100 and 200, two power supplies, 110 and 210, two batteries, 111 and 211, two battery switches, 112 and 212, and the data storage device 300.

The storage system of the second embodiment has two controller-power supply-battery sets and both sets operate the same way, which enables the storage system to continue operating even when a failure occurs in one of the systems.

The configuration and operation of the controllers 100 and 200 are the same as those of the controllers 100 and 200 of the first embodiment described above, and descriptions thereof are omitted here.

The power supplies 110 and 210 each convert a commercial power source into a direct-current power source to supply direct-current power having at least one voltage necessary for the storage system (e.g., the controller 100 or 200). The power supply 110 supplies power to the controller 100, and the power supply 210 supplies power to the controller 200. The power supplies 110 and 210 also supply power for charging the batteries 111 and 211.

The batteries 111 and 211 are each constituted of a chargeable/dischargeable secondary battery (for example, a nickel-metal hydride battery or a lithium ion battery). When a power outage occurs, the battery 111 supplies power to a part of the controller 100 (for example, the micro computer 103, the cache memory 104, the LSI 105, the flash memory 106, and the flash interface 107), whereas the battery 211 supplies power to a part of the controller 200 (for example, the micro computer 203, the cache memory 204, the LSI 205, the flash memory 206, and the flash interface 207). Large-capacity capacitors may be used instead of the batteries 111 and 211.

The battery switch 112 is a switch for switching to/from a connection between the battery 111 and the controller 100 and a connection between the battery 111 and the power supplies 110 and 210. The battery switch 212 is a switch for switching to/from a connection between the battery 211 and the controller 200 and a connection between the battery 211 and the power supplies 110 and 210.

The batteries 111 and 211 and the battery switches 112 and 212 are provided outside the controllers 100 and 200 in this embodiment. Alternatively, the battery 111 and the battery switch 112 may be provided inside the controller 100 while the battery 211 and the battery switch 212 may be provided inside the controller 200.

The data storage device 300 is constituted of a plurality of magnetic disk drives, and stores user data requested by the host computer. The plurality of magnetic disk drives constitutes a RAID to prevent a loss of user data in the event of a failure in at least one of the magnetic disk drives.

FIGS. 8 to 11 are diagrams illustrating power source switching of the storage system according to the second embodiment.

Figure 8:
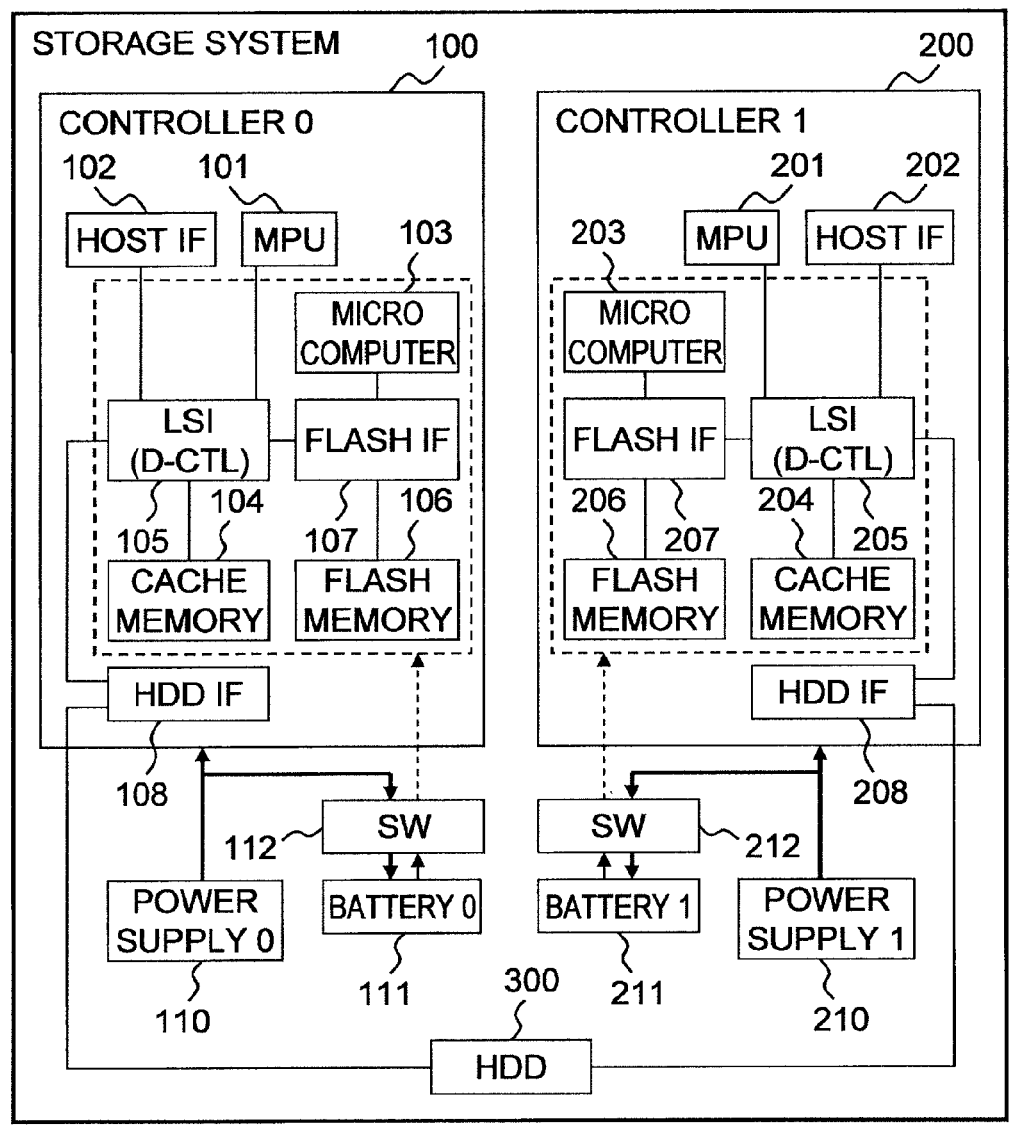
FIG. 8 is an explanatory diagram illustrating power source connection of the storage system in a normal state according to the second embodiment.

Normally, as illustrated in FIG. 8, commercial power is supplied to the power supplies 110 and 210, and direct-current power obtained by conversion in the power supplies 110 and 210 is supplied to the controllers 100 and 200.

The battery switch 112 connects the power supply 110 to the battery 111 to charge the battery 111 with power that is output from the power supply 110. Similarly, the battery switch 212 connects the power supply 210 to the battery 211 to charge the battery 211 with power that is output from the power supply 210.

Figure 9:
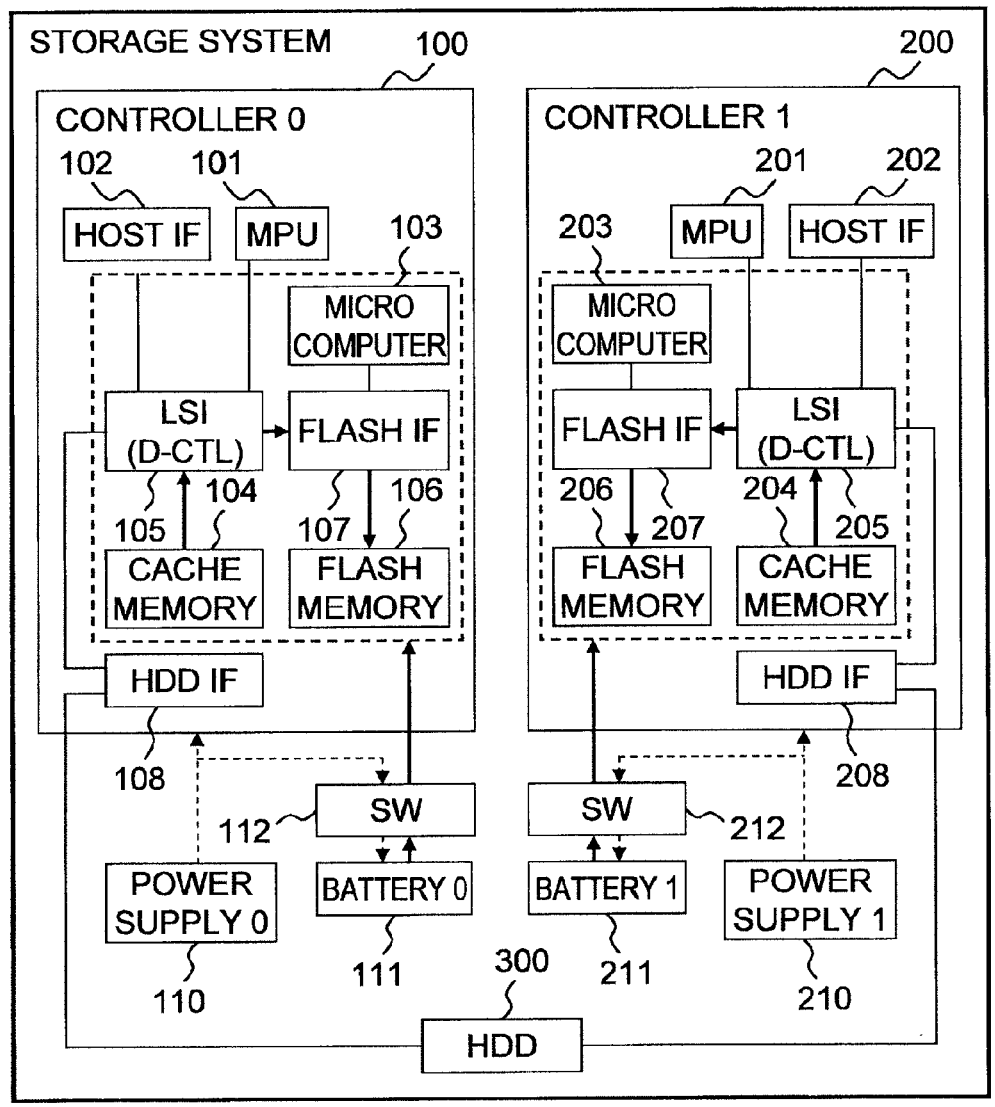
FIG. 9 is an explanatory diagram illustrating power source connection of the storage system in a power outage state according to the second embodiment.

When a power outage occurs, as illustrated in FIG. 9, the power supplies 110 and 210 stop outputting direct-current power. The drop in voltages output from the power supplies 110 and 210 turns the battery switches 112 and 212 on to connect the batteries 111 and 211 to the controllers 100 and 200, respectively, and the batteries 111 and 211 start supplying power to a part of the controller 100 and a part of the controller 200, respectively. The battery switch 112 may turn on while the storage system is operating, and may turn to connect the battery 111 and the controller 100 in a case of drop in a voltage output from the power supplies 110 or 210. The micro computers 103 and 203 read data stored in the cache memory 104 and data stored in the cache memory 204 and write the read data in the flash memories 106 and 206, respectively, to thereby back up the cache data.

Figure 10:
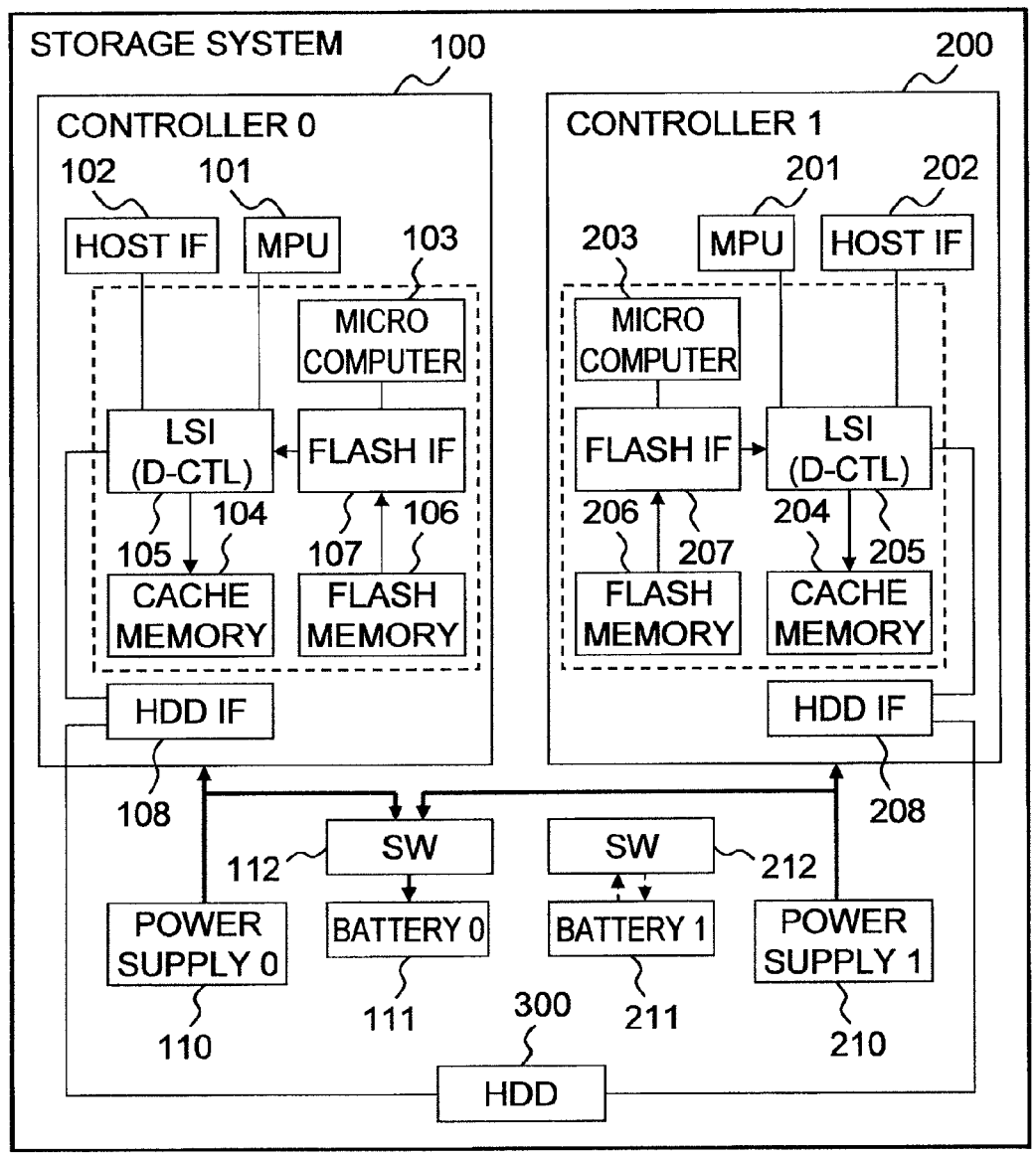
FIG. 10 is an explanatory diagram illustrating power source connection of the storage system after power is restored according to the second embodiment.

When the power outage ends and the power supplies resume outputting power, as illustrated in FIG. 10, the storage system is restarted, and the micro computers 103 and 203 read data out of the flash memories 106 and 206 and write the read data in the cache memories 104 and 204, respectively. The data written in the cache memories 104 and 204 is then written in the data storage device 300 at a suitable timing.

If a power outage occurs again when neither the battery 111 nor the battery 211 has an amount of charge that equals power necessary to back up data stored in the cache memory 104 to the flash memory 106, there is a fear that the data stored in the cache memory 104 may be lost. The storage system therefore operates in the cache-through mode where the cache memories 104 and 204 are not used. In this case, the battery 111 of the 0-system is charged with power from the two power supplies 110 and 210 whereas the battery 211 of the 1-system is not charged.

This charging desirably uses the maximum current that can be output from the power supplies 110 and 210. For instance, in the case where rapid charging with a current of 1 C is performed normally, double-speed charging with a current of 2 C can be performed here. To give another example, in the case where regular-speed charging with a current of 0.1 C is performed normally, rapid charging with a current of 0.2 C to 1 C can be performed here.

Figure 11:
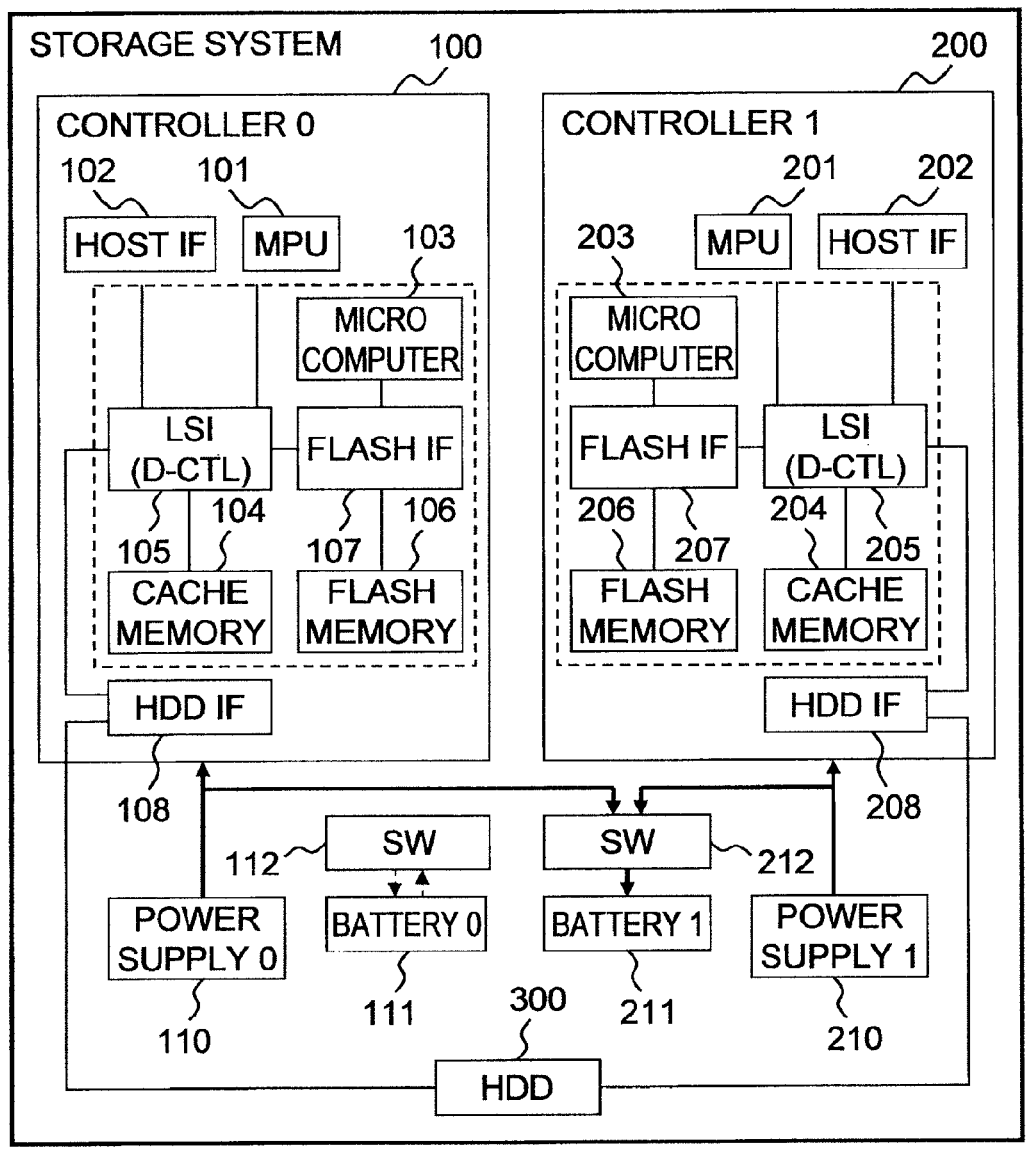
FIG. 11 is an explanatory diagram illustrating power source connection of the storage system after power is restored according to the second embodiment.

In the case where a trouble occurs in the 0-system controller 100 or the 0-system battery 111, as illustrated in FIG. 11, the charging priority order is changed in a manner that stops the charging of the 0-system battery 111 and charges the 1-system battery 211.

After the 0-system battery 111 is charged with enough power to back up data stored in the cache memory 104, the cache data can be protected even if a power outage strikes again. The cache-through mode is therefore ended and the storage system starts using the cache memory 104. The charging of the 0-system battery 111 is also stopped and the 1-system battery 211 is charged with power from the two power supplies 110 and 210 as illustrated in FIG. 11, in order to recharge the 1-system battery 211 quickly.

Power source switching processing of the storage system according to the second embodiment is described next. The power source switching processing of the first embodiment illustrated in FIG. 4 applies to the second embodiment.

Figure 12:
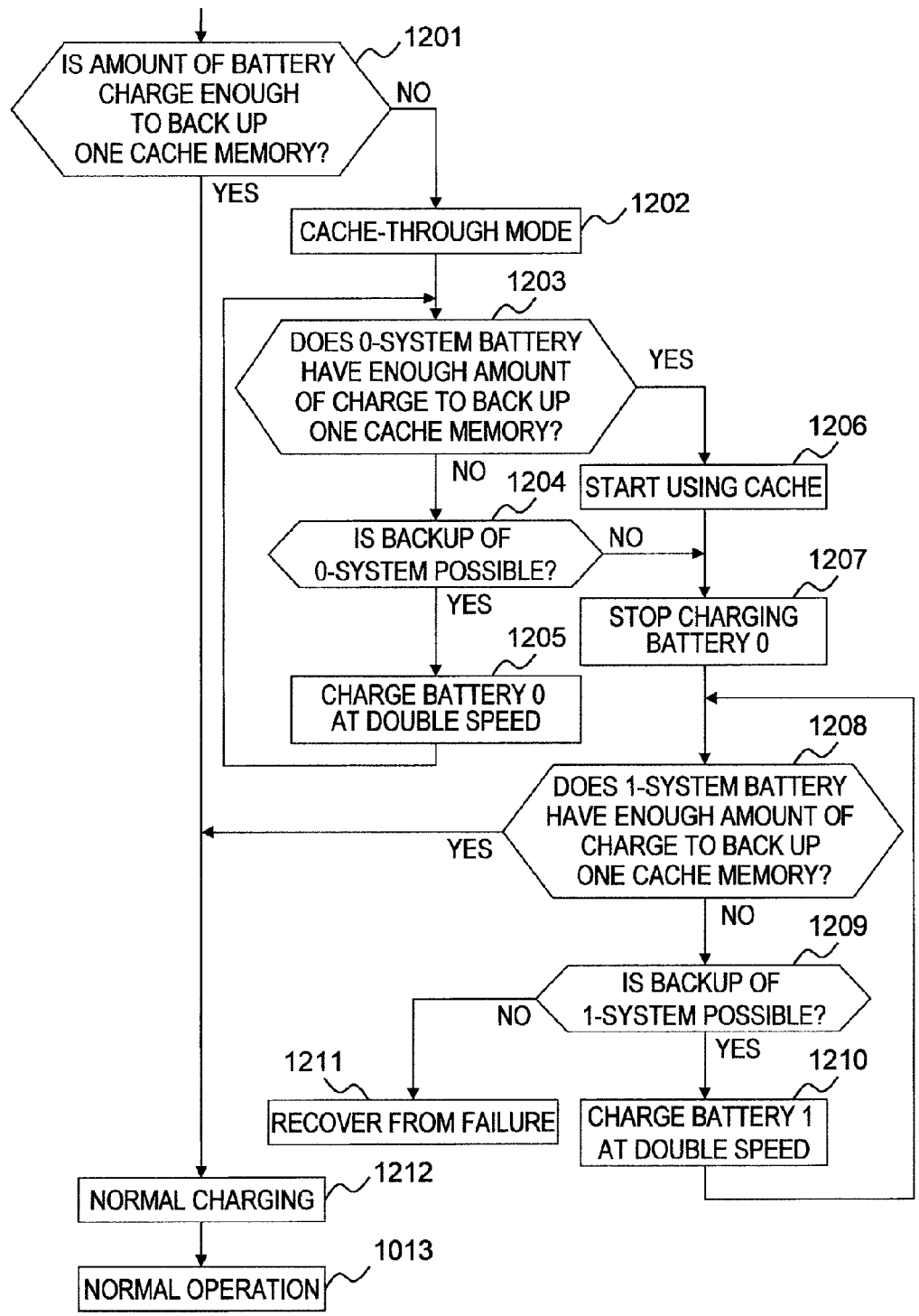
FIG. 12 is a flow chart of detailed power source switching processing of the storage system according to the second embodiment.

FIG. 12 is a flow chart of detailed power source switching processing of the storage system according to the second embodiment, and illustrates details of Steps 1012 to 1014 of the flow chart of FIG. 4. FIG. 12 mainly deals with processing of the controller 100 of the 0-system, but this processing may be executed by the controller 200 of the 1-system.

First, the micro processor 101 determines whether the amount of charge of the 0-system battery 111 or the 1-system battery 211 exceeds enough power to back up data stored in the cache memory of one controller (1201). When it is determined as a result that the amount of charge of the 0-system battery 111 or the 1-system battery 211 exceeds enough power to back up data stored in the cache memory of one controller, the micro processor 101 exerts control in a manner that charges the battery 111 and the battery 211 to full (1212), and starts operating in the normal mode (illustrated in FIG. 2) (1013).

In the case where neither the 0-system battery 111 nor the 1-system battery 211 is charged with enough power to back up data stored in the cache memory of one controller, on the other hand, the micro processor 101 controls the storage system to start operating in the cache-through mode (illustrated in FIG. 3) (1202).

The micro processor 101 then determines whether the amount of charge of the 0-system battery 111 exceeds enough power to back up data stored in the cache memory of one controller (1203). When it is determined as a result that the amount of charge of the battery 111 falls short of enough power to back up data stored in the cache memory of one controller (NO in 1203), the micro processor 101 determines whether data stored in the cache memory 104 of the 0-system controller 100 can be backed up (1204). It is determined that data of the 0-system cannot be backed up when, for example, the 0-system controller 100 is experiencing a failure or when the battery 111 is experiencing a failure.

When it is determined as a result that data stored in the cache memory 104 of the 0-system controller 100 can be backed up (YES in 1204), the micro processor 101 switches the battery switches 112 and 212 in a manner that supplies the 0-system battery 111 with power output from both of the power supplies 110 and 210 (1205). In this way, the battery 111 can be charged in double-speed.

The processing then returns to Step 1203 to repeat Steps 1203 to 1205 until the amount of charge of the battery 111 exceeds enough power to back up data stored in the cache memory of one controller.

In the case where the amount of charge of the battery 111 exceeds enough power to back up data stored in the cache memory of one controller (YES in 1203), on the other hand, the micro processor 101 starts operating in the normal mode where the cache memory 104 is used (1206), and stops the charging of the 0-system battery 111 (1207).

This step may use only one of the cache memories 104 and 204 that can be backed up, or both of the cache memories 104 and 204.

In the case where data stored in the cache memory 104 of the 0-system controller 100 cannot be backed up (NO in 1204), the micro processor 101 changes the charging priority order and switches the battery switch 112 in a manner that stops the charging of the 0-system battery 111 (1207).

After Step 1207, the micro processor 101 determines whether the amount of charge of the 1-system battery 211 exceeds enough power to back up data stored in the cache memory of one controller (1208). When it is determined as a result that the amount of charge of the battery 211 exceeds enough power to back up data stored in the cache memory of one controller, the micro processor 101 exerts control in a manner that charges the battery 111 and the battery 211 to full (1212), and starts operating in the normal mode (illustrated in FIG. 2) (1013).

In the case where the amount of charge of the battery 211 falls short of enough power to back up data stored in the cache memory of one controller, on the other hand, the micro processor 101 determines whether data stored in the cache memory 104 of the 0-system controller 100 and data stored in the cache memory 204 of the 1-system controller 200 can be backed up (1209). The determination about the 0-system is made in the manner described above. It is determined that data of the 1-system cannot be backed up when, for example, the 1-system controller 200 is experiencing a failure or when the battery 111 is experiencing a failure.

When it is determined as a result that neither data stored in the cache memory 104 of the 0-system controller 100 nor data stored in the cache memory 204 of the 1-system controller 200 can be backed up, the micro processor 101 sends out the failure alarm from the storage system, and waits for the administrator to execute the failure recovery processing (for example, replacing the failed part) (1211).

In the case where data stored in the cache memory 204 of the 1-system controller 200 can be backed up, on the other hand, the micro processor 101 switches the battery switch 212 in a manner that supplies the 1-system battery 211 with power output from both of the power supplies 110 and 210 (1210). In this way, the battery 111 can be charged in double-speed. If data stored in the cache memory 204 of the 1-system controller 200 can be backed up, the determination made in Step 1209 may be YES irrespective of whether data stored in the cache memory 104 of the 0-system controller 100 can be backed up.

In the case where data stored in the cache memory 104 of the 0-system controller 100 cannot be backed up and data stored in the cache memory 204 of the 1-system controller 200 cannot be backed up, the micro processor 101 only needs to shut down the controller 200 and allows the 0-system alone to operate in the cache-through mode.

The processing then returns to Step 1208 to repeat Steps 1208 to 1210 until the amount of charge of the battery 211 exceeds enough power to back up data stored in the cache memory of one controller.

When there is a failure in one of the power supplies, the batteries 111 and 211 are charged one at a time. This lessens the burden of the one working power supply (prevents the power supply from outputting power that exceeds the rated power).

When a replacement battery is a new battery, it is recommended to secure a required amount of charge at an early point by charging the new battery at double speed, because the amount of charge of the new battery may be insufficient.

In the processing described above, the 0-system battery 111 is charged at double speed to enough power to back up data stored in the cache memory of one controller, then the 1-system battery 211 is charged at double speed to enough power to back up data stored in the cache memory of one controller, and then the battery 111 and the battery 211 are charged normally to full. This charging pattern may be replaced with the following modification examples.

Modification Example 1

The 0-system battery 111 is charged at double speed to enough power to back up data stored in the cache memory of one controller, and then the 0-system battery 111 and the 1-system battery 211 are charged normally to full.

Modification Example 2

The 0-system battery 111 is charged at double speed to enough power to back up data stored in the cache memory of one controller, then the 0-system battery 111 is charged at double speed to full, and then the 1-system battery 211 is charged at double speed to full.

Figure 13:
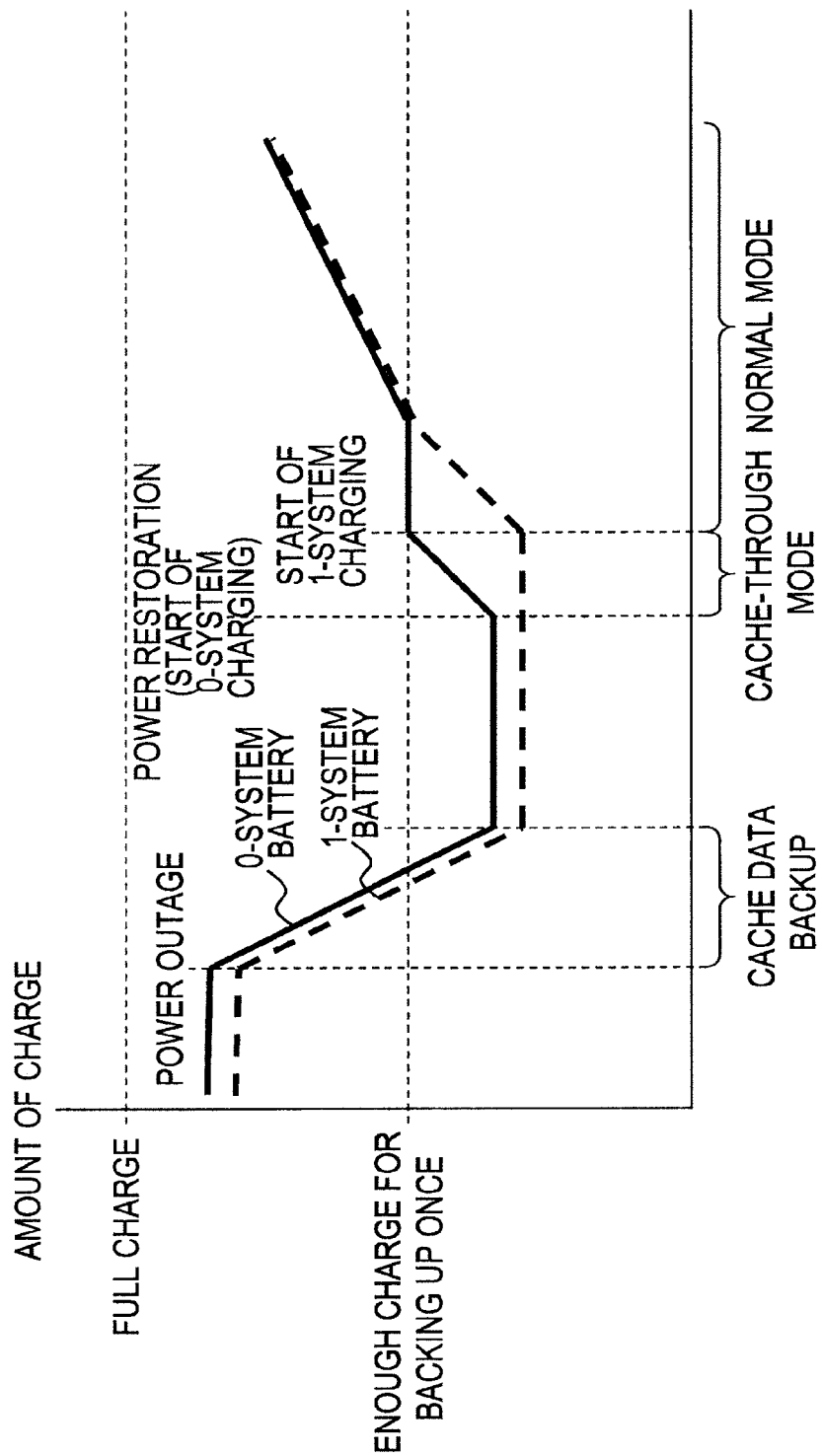
FIG. 13 is a timing chart illustrating an operation of the storage system according to the second embodiment.

FIG. 13 is a timing chart illustrating the relation between power source switching and the operation of the controllers 100 and 200 according to the second embodiment.

When a power outage occurs, power supplied from the 0-system battery 111 is used to back up data stored in the cache memory 104 to the flash memory 106, and power supplied from the 1-system battery 211 is used to back up data stored in the cache memory 204 to the flash memory 206. This diminishes the amount of charge of the batteries 111 and 211.

When power is restored, the power supplies 110 and 210 supply power to the 0-system battery 111 to start double-speed charging. At this point, the amount of charge of the battery 111 falls short of power necessary to back up data stored in the cache memory 104 to the flash memory 106, and the amount of charge of the battery 211 falls short of power necessary to back up data stored in the cache memory 204 to the flash memory 206. The controllers 100 and 200 therefore operate in the cache-through mode.

After the amount of charge of the battery 111, which has been charged first, reaches power necessary to back up data stored in the cache memory 104 to the flash memory 106, the controllers 100 and 200 start operating using the cache memory 104, the charging of the 0-system battery 111 is stopped, and the double-speed charging of the 1-system battery 211 is started.

Subsequently, after the amount of charge of the 1-system battery 211 reaches power necessary to back up data stored in the cache memory 204 to the flash memory 206, the controllers 100 and 200 start operating using the cache memories 104 and 204, and the 0-system battery 111 and the 1-system battery 211 are charged normally to full.

The operation of the storage system according to the second embodiment described above is summarized as follows.

(1) When nothing is wrong with the 0-system controller and the 0-system battery and the amount of charge of the 0-system battery is enough to back up data stored in the cache memory of one controller, the storage system operates in a mode that uses the cache memory(-ries).

(2) When there is a failure in the 0-system controller or the 0-system battery, the 0-system cache memory is not used and the 1-system controller is put into operation. (3) When nothing is wrong with the 1-system controller and the 1-system battery and the amount of charge of the 1-system battery is enough to back up data stored in the cache memory of one controller, the storage system operates in a mode that uses the cache memory(-ries).

(4) When there is a failure in the 1-system controller or the 1-system battery, the 1-system cache memory is not used and the 0-system controller is put into operation.

(5) When the 0-system battery and the 1-system battery are both experiencing a failure, the storage system operates in the cache-through mode.

As described above, according to the second embodiment, the storage system operates using the cache memory(-ries) even when the 0-system battery 111 or the 1-system battery 211 is not charged fully, if the amount of the charge of the 0-system battery 111 or the 1-system battery 211 exceeds enough power to back up data stored in the cache memory of one controller. The period of time in which the storage system operates in the cache-through mode is thus reduced, and the storage system is accordingly improved in reliability.

In addition, when there is a failure in at least one of the controller and the battery of the same system, the charging priority order is changed in a manner that stops the charging of the battery of the failed system and charges the battery of the other system, thereby enabling the system that surely works to restore quickly. The period of time in which the storage system operates in the cache-through mode is thus reduced and the storage system is improved in reliability.

While the present invention has been described in detail and pictorially in the accompanying drawings, the present invention is not limited to such detail but covers various obvious modifications and equivalent arrangements, which fall within the purview of the appended claims.

The invention claimed is:

1. A storage system for storing write data requested by a host computer, comprising:
   a data storage device which stores the write data requested by the host computer; and
   a first controller and a second controller which control input and output of the data to and from the data storage device,
   wherein the first controller includes:
   at least one host interface which receives a write request from the host computer;
   a first cache memory which temporarily stores the write data requested by the host computer; and
   a first non-volatile memory to which the data stored in the first cache memory is backed up in a power outage,
   wherein the second controller includes:
   at least one host interface which receives a write request from the host computer;
   a second cache memory which temporarily stores the write data requested by the host computer; and
   a second non-volatile memory to which the data stored in the second cache memory is backed up in a power outage,
   wherein the storage system further comprises at least one power storage device which supplies electric power to the first and second cache memories and the first and second non-volatile memories during a power outage, and
   wherein at least one of the first and second controllers is configured to:
   determine whether an amount of charge of the at least one power storage device is equal to or larger than a predetermined amount of power, which is one of an amount of power necessary to transfer the data stored in the first cache memory to the first non-volatile memory, and an amount of power necessary to transfer the data stored in the second cache memory to the second non-volatile memory after power is restored from a power outage;
   store the write data requested by the host computer in the data storage device, without storing the requested write data in neither the first cache memory nor the second cache memory in a case where the amount of charge of the at least one power storage device is smaller than the predetermined amount of power; and
   store the write data requested by the host computer in at least one of the first and second cache memories, and then store the requested write data in the data storage device in a case where the amount of charge of the at least one power storage device is equal to or larger than the predetermined amount of power;
   wherein the at least one power storage device includes a first power storage device, which supplies electric power to the first cache memory and the first non-volatile memory during a power outage, and a second power storage device, which supplies electric power to the second cache memory and the second non-volatile memory during a power outage, and
   wherein the at least one of the first and second controllers is configured to: determine whether an amount of charge of the first power storage device is equal to or larger than the amount of power necessary to transfer the data stored in the first cache memory to the first non-volatile memory after power is restored from a power outage;
   charge the first power storage device with a current larger than a normal charging current in a case where the amount of charge of the first power storage device is smaller than the amount of power necessary to transfer the data stored in the first cache memory to the first non-volatile memory; and
   store the write data requested by the host computer in the at least one of the first and second cache memories, and then store the requested write data in the data storage device in a case where the amount of charge of the first power storage device is equal to or larger than the amount of power necessary to transfer the data stored in the first cache memory to the first non-volatile memory.

2. The storage system according to claim 1, wherein the at least one power storage device is one power storage device, and
   wherein the at least one of the first and second controllers is configured to: determine whether a failure occurs in the first cache memory and the first non-volatile memory in a case where an amount of charge of the one power storage device is equal to or larger than the predetermined amount of power; and
   in a case where a failure occurs in neither the first cache memory nor the first non-volatile memory, store the write data requested by the host computer in the at least one of the first and second cache memories, then store the requested write data in the data storage device, and charge the one power storage device.

3. The storage system according to claim 1,
   wherein the at least one power storage device is one power storage device, and wherein the at least one of the first and second controllers is configured to:

determine whether a failure occurs in the first cache memory and the first non-volatile memory in a case where an amount of charge of the one power storage device is equal to or larger than the predetermined amount of power;

determine whether a failure occurs in the second cache memory and the second non-volatile memory in a case where a failure occurs in any one of the first cache memory and the first non-volatile memory; and in a case where a failure occurs in neither the second cache memory nor the second non-volatile memory, store the write data requested by the host computer in the at least one of the first and second cache memories, then store the requested write data in the data storage device, and charge the one power storage device.

4. The storage system according to claim 1, wherein the at least one of the first and second controllers is configured to:

charge the second power storage device with a current larger than the normal charging current after the amount of charge of the first power storage device becomes equal to or larger than the amount of power necessary to transfer the data stored in the first cache memory to the first non-volatile memory; and subsequently, charge the first and second power storage devices with the normal charging current after an amount of charge of the second power storage device becomes equal to or larger than the amount of power necessary to transfer the data stored in the second cache memory to the second non-volatile memory.

5. The storage system according to claim 1, wherein the at least one of the first and second controllers is configured to:

stop charging the first power storage device and charge the second power storage device in a case where a failure occurs in at least one of the first cache memory and the first non-volatile memory; and stop charging the second power storage device and charge the first power storage device in a case where a failure occurs in at least one of the second cache memory and the second non-volatile memory.

6. The storage system according to claim 1, wherein the at least one of the first and second controllers is configured to:

store the write data requested by the host computer in the data storage device, without storing the requested write data in neither the first cache memory nor the second cache memory in a case where neither the first power storage device nor the second power storage device has an amount of charge that equals the one of the amount of power necessary to transfer the data stored in the first cache memory to the first non-volatile memory, and the amount of power necessary to transfer the data stored in the second cache memory to the second nonvolatile memory;

in a case where the amount of charge of the first power storage device is equal to or larger than the amount of power necessary to transfer the data stored in the first cache memory to the first non-volatile memory, store the write data requested by the host computer in the at least one of the first and second cache memories, then store the requested write data in the data storage device, and stop charging the first power storage device;

determine whether a failure occurs in the second cache memory and the second non-volatile memory in a case where the amount of charge of the second power storage device is smaller than the amount of power necessary to transfer the data stored in the second cache memory to the second non-volatile memory; and charge the second power storage device with a current larger than the normal charging current in a case where a failure occurs in neither the second cache memory nor the second non-volatile memory.

7. A control method to be executed in a storage system for storing write data that is requested by a host computer, the storage system including a data storage device which stores the write data requested by the host computer, and a first controller and a second controller which control input and output of the data to and from the data storage device, the first controller including at least one host interface which receives a write request from the host computer, a first cache memory which temporarily stores the write data requested by the host computer, and a first non-volatile memory to which the data stored in the first cache memory is backed up in a power outage, the second controller including at least one host interface which receives a write request from the host computer, a second cache memory which temporarily stores the write data requested by the host computer, and a second non-volatile memory to which the data stored in the second cache memory is backed up in a power outage, the storage system further including at least one power storage device which supplies electric power to the first and second cache memories and to the first and second non-volatile memories during a power outage, the method including:

a determination step of determining, by at least one of the first and second controllers, whether an amount of charge of the at least one power storage device is equal to or larger than a predetermined amount of power, which is one of an amount of power necessary to transfer the data stored in the first cache memory to the first non-volatile memory, and an amount of power necessary to transfer the data stored in the second cache memory to the second non-volatile memory after power is restored from a power outage;

a cache-through operation step of controlling, by the at least one of the first and second controllers, the storage system to store the write data requested by the host computer in the data storage device, without storing the requested write data in neither the first cache memory nor the second cache memory in a case where it is determined that the amount of charge of the at least one power storage device is smaller than the predetermined amount of power; and a cache using operation step of controlling, by the at least one of the first and second controllers, the storage system to store the write data requested by the host computer in at least one of the first and second cache memories, and then store the requested write data in the data storage device in a case where it is determined that the amount of charge of the at least one power storage device is equal to or larger than the predetermined amount of power;

wherein the at least one power storage device includes a first power storage device, which supplies electric power to the first cache memory and the first non-volatile memory during a power outage, and a second power storage device, which supplies electric power to the second cache memory and the second non-volatile memory during a power outage, wherein the determination step includes the step of determining whether an amount of charge of the first power storage device is equal to or larger than the amount of power necessary to transfer the data stored in the first cache memory to the first non-volatile memory after power is restored from a power outage, wherein the cache using operation step includes a step of controlling the storage system, by the at least one of the first and second controllers, to store the write data requested by the host computer in the at least one of the first and second cache memories, and then store the requested write data in the data storage device in a case where it is determined that the amount of charge of the first power storage device is equal to or larger than the amount of power necessary to transfer the data stored in the first cache memory to the first non-volatile memory, and wherein the method further includes the step of controlling the storage system to charge the first power storage device with a current larger than a normal charging current in a case where it is determined that the amount of charge of the first power storage device is smaller than the amount of power necessary to transfer the data stored in the first cache memory to the first non-volatile memory.

8. The control method for a storage system according to claim 7, wherein the at least one power storage device is one power storage device, and wherein the cache using operation step including the steps of:

determining, by the at least one of the first and second controllers, whether a failure occurs in the first cache memory and the first non-volatile memory in a case where it is determined that an amount of charge of the one power storage device is equal to or larger than the predetermined amount of power; and in a case where it is determined that a failure occurs in neither the first cache memory nor the first non-volatile memory, controlling the storage system, by the at least one of the first and second controllers, to store the write data requested by the host computer in the at least one of the first and second cache memories, then store the requested write data in the data storage device, and charge the one power storage device.

9. The control method for a storage system according to claim 7, wherein the at least one power storage device is one power storage device, and wherein the cache using operation step includes the steps of determining whether a failure occurs in the first cache memory and the first non-volatile memory in a case where it is determined that an amount of charge of the one power storage device is equal to or larger than the predetermined amount of power;

determining whether a failure occurs in the second cache memory and the second non-volatile memory in a case where it is determined that a failure occurs in any one of the first cache memory and the first non-volatile memory; and in a case where it is determined that a failure occurs in neither the second cache memory nor the second non-volatile memory, controlling the storage system, by the at least one of the first and second controllers, to store the write data requested by the host computer in the at least one of the first and second cache memories, then store the requested write data in the data storage device, and charge the one power storage device.

10. The control method for a storage system according to claim 7, further including the steps of:

controlling the storage system, by the at least one of the first and second controllers, to charge the second power storage device with a current larger than the normal charging current after the amount of charge of the first power storage device becomes equal to or larger than the amount of power necessary to transfer the data stored in the first cache memory to the first non-volatile memory; and subsequently, controlling the storage system, by the at least one of the first and second controllers, to charge the first and second power storage devices with the normal charging current after an amount of charge of the second power storage device becomes equal to or larger than the amount of power necessary to transfer the data stored in the second cache memory to the second non-volatile memory.

11. The control method for a storage system according to claim 7, further including the steps of:

controlling the storage system, by the at least one of the first and second controllers, to stop charging the first power storage device and charge the second power storage device in a case where it is determined that a failure occurs in at least one of the first cache memory and the first non-volatile memory; and controlling the storage system, by the at least one of the first and second controllers, to stop charging the second power storage device and charge the first power storage device in a case where it is determined that a failure occurs in at least one of the second cache memory and the second non-volatile memory.

12. The control method for a storage system according to claim 7, wherein the cache-through operation step includes the step of, storing, by the at least one of the first and second controllers, the write data requested by the host computer in the data storage device, without storing the requested write data in neither the first cache memory nor the second cache memory in a case where it is determined that neither the first power storage device nor the second power storage device has an amount of charge that equals the one of the amount of power necessary to transfer the data stored in the first cache memory to the first non-volatile memory, and the amount of power necessary to transfer the data stored in the second cache memory to the second non-volatile memory, and wherein the cache using operation step includes the steps of:

in a case where it is determined that the amount of charge of the first power storage device is equal to or larger than the amount of power necessary to transfer the data stored in the first cache memory to the first non-volatile memory, controlling the storage system to store, by the at least one of the first and second controllers, the write data requested by the host computer in the at least one of the first and second cache memories, then store the requested write data in the data storage device, and stop charging the first power storage device;

determining whether a failure occurs in the second cache memory and the second non-volatile memory in a case where it is determined that the amount of charge of the second power storage device is smaller than the amount of power necessary to transfer the data stored in the second cache memory to the second non-volatile memory; and controlling the storage system, by the at least one of the first and second controllers, to charge the second power storage device with a current larger than the normal charging current in a case where it is determined that a failure occurs in neither the second cache memory nor the second non-volatile memory.

* * * * *